United States Patent [19]
Feiler et al.

[11] 3,956,251
[45] May 11, 1976

[54] METHOD FOR PREPARING VINYL HALIDE HOMOPOLYMERS HAVING IMPROVED PROCESSING CHARACTERISTICS

[75] Inventors: Leonard Feiler, Spring Valley, N.Y.; Sheldon F. Gelman, Danbury, Conn.

[73] Assignee: Stauffer Chemical Company, Westport, Conn.

[22] Filed: June 19, 1970

[21] Appl. No.: 47,885

Related U.S. Application Data

[63] Continuation-in-part of Ser. No. 756,309, Aug. 29, 1968, abandoned, which is a continuation of Ser. No. 174,250, Aug. 23, 1971.

[52] U.S. Cl. ............................. 526/73; 260/897 C; 526/79; 526/344; 526/82; 526/86
[51] Int. Cl.² ..................... C08F 1/11; C08F 1/80; C08F 3/30
[58] Field of Search ............................. 260/92.8 W

[56] References Cited
UNITED STATES PATENTS

| | | | |
|---|---|---|---|
| 2,868,762 | 1/1959 | Oukes | 260/94.9 |
| 3,022,282 | 2/1962 | Marous | 260/92.8 |
| 3,033,839 | 5/1962 | Heckmaier | 260/92.8 |
| 3,205,204 | 9/1965 | Heckmaier | 260/92.8 |
| 3,287,447 | 11/1966 | Faure | 260/92.8 |
| 3,468,859 | 9/1969 | Davies | 526/73 |

*Primary Examiner*—Christopher A. Henderson
*Attorney, Agent, or Firm*—Paul J. Juettner

[57] ABSTRACT

Vinyl halide homopolymers, particularly polyvinyl chloride, which exhibit improved processing characteristics without sacrificing physical properties are prepared by partially polymerizing a vinyl halide monomer at an initial temperature level whereupon the reaction temperature is then raised and the polymerization is continued at this increased temperature level preferably while in the presence of a chain transfer agent so as to obtain a polymer having an average molecular weight range different from that obtainable at the first reaction temperature. The resulting polyvinyl chloride provides the physical characteristics of polymer blends but can be processed much more readily than a mechanical blend of homopolymers of varying molecular weights, fusing more easily and without the undesirable formation of fish eyes.

18 Claims, No Drawings

METHOD FOR PREPARING VINYL HALIDE HOMOPOLYMERS HAVING IMPROVED PROCESSING CHARACTERISTICS

RELATED APPLICATION

This application is a continuation-in-part of application Ser. No. 756,309, filed Aug. 29, 1968, now abandoned in favor of continuation application Ser. No. 174,250, filed Aug. 23, 1971, all applications being assigned to the assignee of the subject application.

BACKGROUND OF THE INVENTION

Vinyl halide homopolymers, such as PVC, i.e. polyvinyl chloride, can be prepared in a wide variety of molecular weights, those having a higher molecular weight generally exhibiting better physical properties, such as toughness, than those polymers having a lower molecular weight. However, the higher the molecular weight of the polymer, the more difficult it is to process into final products. Thus, for example, in molding and extruding operations, the higher molecular weight vinyl halide polymers require more shear force and/or higher temperatures in order to flux the polymer as compared with lower molecular weight materials. The use of increased shear force and/or higher temperatures increases the internal temperature of the polymer. Therefore, since vinyl halide polymers are thermally unstable and degrade in the presence of excessive heat, this increase in the internal temperature of the polymer is highly disadvantageous. In addition, the use of increased shear forces requires the input of additional work energy, as compared with the processing of polymers of lower molecular weight, and this additional work input adds to the cost of processing the polymer.

In an attempt to obtain products characterized by the easier fluxing of lower average molecular weight vinyl halide polymers and the physical properties of the higher average molecular weight polymers, various blends of these materials have been formulated. However, these attempts to blend the two types of polymers during their fabrication have been fraught with difficulty. Thus, during processing, the low average molecular weight polymer fluxes first and, because of the poor heat transfer characteristics of vinyl halide polymers, the higher average molecular weight polymer is only partially fluxed. Furthermore, the shear forces applied during processing to affect flux are not applied to the higher average molecular weight materials as they are floating or suspended in the fluxed, low average molecular weight material and are, therefore, passed through the processing equipment without being fused. Products formed from such blends have noticeable imperfections called fish eyes which comprise gel particles of unfused, higher molecular weight polymer. These fish eyes are not only disadvantageous from an aesthetic point of view but also serve to extensively weaken the product. Needless to say, any polymer composition which must withstand severe impact forces such, for example, as films, sheets, tubes, bottles and the like must be substantially free from fish eyes. Since vinyl halide polymers are thermally degradable and become more unstable the longer they are worked under shear, it has been found impractical to subject such blends to high processing temperatures and/or to extended processing in order to overcome the problem of fish eyes. Such extended working is also economically impractical. In addition, fish eyes are a clear demonstration of imcompletely and improperly fused resin particles and are indicative of a commercially unacceptable product.

Thus, it is the object of this invention to provide a method for preparing vinyl halide homopolymers which exhibit improved processing characteristics without sacrificing physical properties. More particularly, it is the object of this invention to provide a method for preparing vinyl halide homopolymers which display physical properties approximating those ordinarily found in blends of high and low molecular weight polymers but which can be more easily processed and to provide final, formed objects which do not contain fish eyes. Various other objects and advantages of this invention will be apparent from a reading of the disclosure which follows hereinafter.

TECHNICAL DISCLOSURE OF THE INVENTION

It has now been found that vinyl halide homopolymers can be economically prepared so as to exhibit the desired broad range of average molecular weight ranges which is attainable with blends but which can, however, be easily processed and which do not form fish eyes in the finally formed products. These products can, therefore, be characterized as vinyl halide polymers which exhibit improved processing characteristics without any sacrifice in their physical properties.

In accordance with the present invention, there is provided a method for preparing vinyl halide homopolymers which exhibit improved processing characteristics. This method comprises initiating the free radical polymerization of a vinyl halide monomer at a first reaction temperature in the range of from about 35° to 55° C. After partial polymerization is accomplished, i.e. after a degree of conversion of monomer to polymer of from about 10 to 40% is attained, the reaction temperature is raised to a level of at least about 60° to 80° C. whereupon the polymerization is completed at this increased reaction temperature preferably in the presence of a chain transfer agent, as hereinafter described, which is introduced into the system at the time the temperature is raised to the second or increased level. The use of this second, increased temperature level is conducive to forming a polymer of an average molecular weight which is lower than the average molecular weight obtainable at the first or lower polymerization temperature. Surprisingly, vinyl halide homopolymers can be formed by means of this process which have a high average molecular weight and which are characterized by physical properties commensurate with polymers of equal average molecular weight formulated by standard polymerization techniques with the additional advantage that the melt flow viscosity, under shear, of the polymers resulting from the process of this invention is decreased so as to provide them with improved processing characteristics. This decrease in melt flow viscosity under shear allows for the processing of these polymers under thermal conditions which are less conducive to degradation without any sacrifice in their physical properties. Furthermore, these polymers possess properties which approximate the physical properties of blends of high and low molecular weight polymers while remaining capable of being fabricated without forming fish eyes.

The exact chemical nature of the polymers resulting from the process of the present invention is not known. In theory, it is believed that an intimate blend of polymer chains having a broad distribution of molecular weights are formed within each polymer or resin particle in the finally obtained product. However, the foregoing is merely theory and applicants do not intend to be bound thereby.

The vinyl halide monomers suitable for use in the process of this invention include, vinyl fluoride, vinyl chloride, vinyl bromide and vinyl iodide, although the use of vinyl chloride is preferred. It is to be understood, moreover, that the process of the present invention is to be limited to the preparation of homopolymers of any of the above listed vinyl halide monomers and does not contemplate preparing copolymers of these vinyl halides with each other or with any other types of vinyl monomers. Moreover, the preferred embodiment of this process comprises the preparation of PVC, i.e. of polyvinyl chloride.

The free-radical initiated polymerization process of this invention can be accomplished using the various conventional methods of polymerization, viz., bulk, mass or so-called oil-phase polymerization, solution polymerization where the vinyl halide is dissolved in a solvent; suspension, bead, or granular polymerization where the vinyl halide is suspended in the form of large droplets in an aqueous medium generally containing a non-emulsifying suspending agent such as hydroxy methyl cellulose or polyvinyl alcohol; and, emulsion polymerization where the vinyl halide is emulsified in water by means of a surface-active emulsifying agent. However, the use of a suspension polymerization process is preferred. Details of these methods of polymerization generally are found in "Unit Processes in Organic Synthesis" by F. H. Groggins, third edition, pages 847–858, published by McGraw-Hill Book Co., Inc. N.Y. 1947. Details of the methods of polymerizing vinyl halides are found in "Vinyl and Related Polymers" by C. E. Schildknecht pages 392–398, published by John Wiley & Sons, Inc., N.Y. 1952. All of the possible variations of polymerization conditions as generally known to those skilled in the art depending on the type of monomer composition, initiator system, and type of polymerization procedure selected are within the purview of the process of this invention.

In conducting the process of this invention by means of the preferred suspension polymerization technique, it is necessary to employ an effective concentration of a suspending agent such, for example, as gelatin, hydroxymethyl cellulose, hydroxyethyl cellulose, hydroxypropyl cellulose, carboxymethyl cellulose, talc, clay, polyvinyl alcohol and the like. As is known to those skilled in the art, the type and concentration of the suspending agent used have some influence on the particle size of the finally obtained product. The exact concentration of suspending agent as well as the particular type employed can be selected by the skilled artisan so long as it is effective to provide the particle size of product desired. However, for most purposes, it is desirable that they have a particle size in the range such that they will all pass through a 40 mesh and substantially all will be retained on a 325 mesh U.S. Sieve size screen. Accordingly, in order to attain the final product within this size range, one should utilize a concentration of suspending agent of from about 0.1 to 0.8%, as based on the weight of the vinyl halide monomer charge. Suspension polymerization techniques are generally preferred inasmuch as the polymerization is easier to conduct and final product is obtained in a particle size which is more readily handled and converted by polymer processors. Various other additives such as thermal stabilizers, buffers and the like, which are normally used in vinyl halide suspension polymerization procedures can also be included in the system in conducting the process of this invention. Procedures such as short-stopping the reaction at any given point can also be utilized.

As has been noted, the polymerization reaction is initiated at a reaction temperature which is in the range of from about 35° to 55° C., with a range of from about 43° to 48° C. being preferred. Thereafter, when conversion is from about 10 to 40% complete, the reaction temperature is raised to a level in the range of from about 60° to 80° C., with a range of from about 63° to 68° C. being preferred. The polymerization is then completed at this second or elevated reaction temperature, the completion of the reaction usually being at a conversion of from about 75–90% as indicated by a drop in the reaction pressure of from about 5–30 psi. It is to be noted that the temperature increase can be affected essentially instantaneously or it may be affected incrementally or continuously over part or all of the period of the polymerization reaction so as to achieve the effect desired in the process of this invention. Thus, the process of this invention is intended to include not only a substantially direct increase in temperature but also the use of a number of incremental temperature increases as well as a continuous temperature increase.

The selection of the first and second reaction temperature as well as the actual length of the complete polymerization period is dependent upon the properties desired in the final polymer product. In general, the properties of the final product are governed by its average molecular weight distribution or the number of polymer chains having specific molecular weights contained within the respective polymer particles. In the products of the present invention, the ultimate molecular weight distribution is based upon the additive quantity of the entire concentration of polymer produced during the polymerization reaction. An approximate plot of molecular weight distribution can be formulated prior to polymerization by determining the molecular weight distribution curve of polymer formed under one set of reaction conditions and adding to that the corresponding molecular weight concentrations that can be formed during that subsequent phase of the polymerization which is to be conducted under elevated temperature conditions.

The molecular weight distribution is influenced by various reaction conditions such as temperature, time and the half-life of the free radical initiator. For any one set of conditions, a specific molecular weight distribution can be obtained and can be plotted, i.e. concentration vs. molecular weight. A change in the reaction conditions brings about a change in the molecular weight distribution and hence a new curve can be plotted for the changed conditions. The additive total can then be used to approximate the composition of the final product. Thus, by determining the molecular weight distributions obtainable under various conditions, it is possible to program the polymerization reaction so as to provide polymer particles having a variety of molecular weight distributions so as to provide polymers having diverse physical properties. Such calculations can be readily performed by those skilled in the art.

The polymerization of vinyl halide monomers by means of the process of this invention is conducted in the presence of an effective concentration of a free-radical initiator or catalyst. Useful free-radical initiators include the organic or inorganic peroxides, persulfates, ozonides, hydroperoxides, peracids, percarbonates, azo compounds, diazonium salts, diazotates, peroxysulfonates, trialkyl borane-oxygen systems and amine oxides.

For use in mass, suspension, and solution polymerization procedures, one generally utilizes an initiator which is soluble in the organic phase such, for example, as benzoyl peroxide, diacetyl peroxide, azobisisobutyronitrile, diisopropyl propyl peroxydicarbonate, azobis ($\alpha$-methyl-$\gamma$-carboxybutyronitrile), caprylyl peroxide, lauroyl peroxide, azobisisobutyramidine hydrochloride, t-butyl peroxypivalate, 2,3-dichlorobenzoyl peroxide and azobis ($\alpha,\gamma$-dimethylvaleronitrile). For use in emulsion polymerization procedures, water soluble initiators such as ammonium persulfate, hydrogen peroxide are used.

Preferably, the initiator which is used in conducting the process of this inventon should be a so-called "hot catalyst" which has a high degree of free-radical initiating activity at lower temperatures as indicated by its short half-life. These hot catalysts may be defined as catalysts having about a 10 hour half-life at a temperature below about 55° C. Exemplary of such hot catalysts are $\alpha,\alpha'$-azobis($\alpha,\gamma$-dimethyl valeronitrile); t-butyl peroxypivalate; diisopropyl peroxydicarbonate; and, $\alpha,\alpha'$-azobis($\alpha,\gamma$-dimethyl-$\gamma$-methoxyvaleronitrile), etc. Utilization of initiators with a lower degree of activity is less desirable in that they require longer polymerization periods which may cause preliminary product degradation as evidenced by discoloration, e.g., pinking. Other known means of initiating vinyl halide polymerizations, such as ultra-violet light or irradiation with gamma-rays can also be used. Initiators which tend to cause ionic or coordination polymerization such as the Ziegler-type initiators can be used in the process of this invention if organic solvents are employed as the reaction medium. The selection of any particular initiator system is dependent upon the temperature utilized in conducting the polymerization since the free-radical generating activity of an initiator generally varies with the temperature. An appropriate selection can be readily made by those skilled in the art. With respect to proportions, the selected free radical initiator should be present in the system in a concentration of from about 0.02 to 0.15%, as based on the total weight of the vinyl halide monomer charge.

In conducting the process of this invention, one may employ a combination of two or more free-radical initiators, one of which has a different degree of free-radical initiating activity or half-life than the other. Preferably, one catalyst of this combination is used during the first or low temperature phase of the polymerization while the second initiator is used during the second or high temperature phase of the reaction. The use of different catalysts in combination with the required temperature increase provides an additional means of modifying both the molecular weight distribution curves of the products prepared under various conditions as well as the molecular weight distribution curve of the final product. This further increases the variety of products which can be prepared in accordance with the process of this invention.

When utilizing two free-radical initiators in the process of this invention, one initiator is used during the first portion of the polymerization at the first reaction temperature and the second is used during the second portion at the second or increased reaction temperature. Initiators having a half-life of 30 minutes or less at 80° C. are suitable for use during the first, or low temperature polymerization step, preferably at a temperature within the range of from about 35° to 55°C. Initiators having half-lives less than 30 minutes at 80° C. include azobis ($\alpha,\gamma$-dimethyl-$\gamma$-methoxyvaleronitrile); azobis($\alpha,\gamma$-dimethylvaleronitrile 2,4-dichlorobenzoyl peroxide; t-butyl peroxypivalate; azobisisobutyramidine hydrochloride and the like. For the second or high temperature phase of the reaction, conventional initiators with half-lives of greater than 30 minutes at 80° C. should be used with the polymerization temperature being in the range of from about 60° to 80° C. Illustrative of such conventional catalysts are lauryl peroxide; caprylyl peroxide; azobisisobutyronitrile; azobis($\alpha$-methyl-$\gamma$-carboxybutyronitrile), acetyl peroxide; benzoyl peroxide; t-butyl peroxyisobutyrate, and the like.

In the process of this invention, the polymerization reaction is initiated at a first, i.e. at a low, reaction temperature which is conducive to forming a polymer of high molecular weight. When the degree of conversion is from about 10 to 60%, and preferably from about 22 to 32%, the reaction temperature is raised and the polymerization is continued until completion. The resulting polymer product has a molecular weight distribution similar to that obtained by conducting the polymerization solely at the higher temperature with the exception that a higher concentration of high molecular weight polymer product is obtained. The polymerization can and is preferably completed at the second reaction temperature, although a third or fourth reaction temperature, both successively higher than the second, can be used if desired.

As has previously been noted, it is preferred in the process of this invention, that an effective concentration of a chain transfer agent be introduced into the system at the time that the temperature therein is raised to the second or upper level. For this purpose, one may utilized any of the chain transfer agents ordinarily employed by those skilled in the art including the aromatic hydrocarbons, such, for example, as cumene, aldehydes such as acetaldehyde; ketones such as acetone; cyclic ethers such as tetrahydrofuran; aliphatic alcohols such as ethanol; and, any of the mono-, di- or polymercaptans such as lauryl mercaptan, ethanedithiol and pentaerythritol tetrathioglycolate. However, optimum results are obtained by the use of a halogenated, and preferably a chlorinated, aliphatic hydrocarbon such, for example, as carbon tetrachloride, chloroform, propylene chloride, methyl chloroform, methylene chloride, butyl chloride and, most desirably, trichloroethylene.

The selected chain transfer agent is added to the system in a concentration of from about 0.5 to 2%, by weight, of the total vinyl halide monomer charge. The entire amount of the chain transfer agent should be introduced at one time, i.e. in a so-called "one-shot" addition, essentially simultaneous with the approximate point in time at which the temperature of the system is raised to the above noted range of from about 60° to 80° C. If the temperature increase is to be continuous or incremental, the chain transfer agent should be added either at the time the continuous temperature increase is begun or at the time of the first incremental temperature increase.

Although satisfactory polymer products can be obtained without the use of a chain transfer agent, such usage is preferred since the presence of the chain transfer agent in the system serves to regulate the molecular weight of the resulting polymer without the use of excessively high polymerization temperatures in order to accomplish this objective. This reduces the heat history, i.e. the amount of heat to which it has been exposed during its polymerization, thereby providing a more heat stable product. In addition, the reduction in reaction pressure which is obtained through the use of these lower reaction temperatures permits the use of conventional suspending agents some of which are heat sensitive, e.g. hydroxymethyl and hydroxypropyl cellulose, and also permits the use of conventional PVC suspension polymerization reactors.

Moreover, when utilizing a chain transfer agent, it is essential that it should be introduced at the same time or immediately prior to the time at which the temperature of the system is raised in order to be able to obtain a final polymer product whose properties most fully simulate those of a blend of high and low molecular weight resin so as to thereby obtain a substantial degree of improvement in the processability of the resulting polymer product. Thus, if the chain transfer agent is added too soon, the molecular weight of the final product will be substantially lower than required and some or all of its desired processing properties will be lost. On the other hand, if the chain transfer agent is added at a point in time which is well past the initiation of the high temperature phase of the reaction, the molecular weight of the final product will be much greater than desired and all or some of its desired processing properties will again be lost.

Thus, it is to be stressed that the properties and processability of the products of this invention are governed by the weight fraction and molecular weights of the respective portions of these products which are produced in the low and high temperaure phases of the polymerization process used in their preparation. Essential process variables include: (1) the precise temperature utilized during each phase of the reaction, this variable serving to control the molecular weight; (2) the reaction time for each phase, this factor serving to control the weight of polymer formed at each temperature phase; and, (3) the optional use of chain transfer agents which also aids in controlling molecular weight.

The vinyl halide polymer compositions, and particularly the polyvinyl chloride, resulting from the polymerization process of this invention may be utilized in any of the coating, impregnating molding and, extrusion and calendering applications known to those skilled in the art. For example, these compositions may be used for preparing such diverse items as calendered films and sheets, blow molded bottles, extruded flat bed and blown films, extruded articles and tubing, etc. and in carrying out such processes as injection molding, fluidized bed coating, electrostatic powder spraying and rotational coating, etc. Moreover, for use in any of the above listed applications, these improved vinyl halide polymer compositions may be formulated with various optional additives which may include, for example, plasticizers such as the alkyl esters of phthalic, adipic and sebacic acids and aryl phosphate esters such, for example, as dioctyl phthalate, ditridecyl phthalate and tricresyl phosphate, etc.; lubricants such as stearic acid or its metal salts, petroleum based waxes, mineral oils, polyethylene, etc.; and, heat and light stabilizers such as barium/cadmium/zinc, barium/cadmium, calcium/zinc stearate, basic lead compounds, tin compounds, such as thiollauric acid or anhydride and n-butyl stannoic acid, epoxidized oils, phenyl salicylates, benzophenones and benzotriazoles, etc. For a more complete listing of plasticizers, lubricants, stabilizers and other functional additives, one may consult "Polyvinyl Chloride" by H. A. Sarvetnick, published by Van Nostrand Reinhold Co., N.Y., N.Y., in 1969.

The following examples further illustrate the embodiment of this invention. In these examples, all parts given are by weight unless otherwise noted.

EXAMPLES I – VIII

In Examples I to VIII, the below described suspension polymerization procedure is utilized unless otherwise noted.

The reaction mixture, or charge, is sealed within a ten-gallon, glass lined, stirred reactor. The polymerization is run until a 10–15 psi pressure drop is obtained at approximately 80% conversion. As indicated in Table I, several of the polymerizations are run at two distinct temperature levels, i.e. low followed by a high temperature. Where so indicated, the temperature increase is initiated at a point in the reaction when approximately 20–25% conversion of monomer to polymer is attained. The chain transfer agents, when used, are added immediately prior to the initiation of the temperature increase. The complete charge consists of the following materials with all concentrations given in parts by weight:

|  | Parts |
|---|---|
| Vinyl Chloride (Monomer) | 100 |
| Deionized water | 200 |
| Hydroxymethyl cellulose (Suspending Agent) | 0.5 |
| Initiator 1 | (See Table 1) |
| Initiator 2 | (See Table 1) |
| Chain Transfer Agent | (See Table 1) |

Table 1

| Example | I | II | III | IV | V | VI | VII | VIII |
|---|---|---|---|---|---|---|---|---|
| Temp. 1(°C) | 45 | 71.5 | 65.5 | 62.5 | 45 | 45 | 45 | 45 |
| (Hr.) | 8 | 5 | 5 | 8¾ | 4½ | 5¼ | 3½ | 4½ |
| Temp. 2(°C) (Hr.) | — | — | — | — | 65 | 65 | 65 | 65 |
| Initiator No. 1 | A | B | B | B | A | A | A | C |
| Pts. Initiator No. 1/100 pts. of monomer | 0.028 | 0.04 | 0.04 | 0.045 | 0.022 | 0.03 | 0.03 | 0.065 |
| Initiator No. 2 | — | — | — | — | B | — | — | B |
| Pts. Initiator No. 2/100 pts. of monomer | — | — | — | — | 0.12 | — | — | — |
| Chain Transfer Agent | — | — | D | — | D | D | E | — |
| Pts. chain transfer agent/ 100 parts of monomer | — | — | 1.05 | — | 2.2 | 2.2 | 2.2 | — |

Table 1-continued

| Example | I | II | III | IV | V | VI | VII | VIII |
|---|---|---|---|---|---|---|---|---|
| Relative Viscosity 1 gm/dl/cyclohexanone at 30°C | 2.76 | 1.84 | 1.84 | 2.11 | 2.07 | 1.89 | 1.97 | 2.20 |
| Brabender Characterization Equilibrium Torque (Meter-grams) | 2,900 | 1,570 | 1,600 | 1,905 | 1,260 | 1,380 | 1,515 | 1,920 |

A = diisopropyl peroxydicarbonate
B = azobis-isobutyronitrile
C = tertiary-butyl peroxypivilate
D = trichloroethylene
E = cumene The PVC polymers resulting from the respective polymerization procedures of Examples I through VIII are evaluated by means of a comparison of both their melt and solution viscosities. Their melt viscosity provides an indication of the amount of work required to process the resin into a finished piece. This property is determined by using a fusion torque rheometer, as sold by the C. W. V. Brabender Company under the trademark "Plasti-Corder." Thus, the polymer in powdered form is placed in the instrument and is fused under the influence of heat and shear. The instrument, which is basically a dynamometer, measures the torque force required to maintain mixer rotors revolving at a constant speed while the polymer is being fused. The torque generally rises from a low point, when the sample of polymer is in powdered form, to a high point at flux after which the torque subsides to an intermediate, equilibrium point or equilibrium torque. The torque remains constant until the polymer degrades whereupon the torque increases as a result of polymer cross-linking. The equilibrium torque value determines the amount of work, in metergrams, which must be applied to the polymer in order to process it. These tests are conducted using a 60 cm³ sample bowl with Banbury type rotors adjusted to operate at 60 revolutions per minute at a temperature of 180° C. The test samples comprise 100 parts of polymer, 3 parts by weight of a sulfur-containing, organo tin stabilizer sold as "Thermolite 31" by the Metal and Thermit Corporation, Rahway, N.J., and 0.5 parts of calcium stearate as a lubricant. Values reported for fusion torque rheology are in meter-grams and are for equilibrium torque.

The solution viscosity of the respective polymers, as measured in terms of their relative viscosities with a 1 gm/dl solution of the polymer in cyclohexanone at 30° C., is an indication of the molecular weight of these polymers since the relative viscosity increases with their molecular weight.

For a typical series of commercially available PVC resins, the amount of "work" required for their processing increases with their molecular weight. For example, the PVC resulting from the process of Example II, has a relative viscosity of 1.84 which coincides with an equilibrium melt viscosity of 1,570 meter-grams while the PVC resulting from the process of Example I has a relative viscosity of 2.76 which corresponds to an equilibrium torque of 2,900 meter-grams. An intermediate situation is shown in the polymer product resulting from the process of Example IV which has a relative viscosity of 2.11 and an equilibrium torque of 1,905 meter-grams. These three PVC samples are typical of commercially available products which are polymerized at a constant temperature level. As can be seen with respect to the product resulting from the process of Example III, simply by adding a chain transfer agent, in this case trichloroethylene, to the polymerization, one can lower the temperature required to obtain a product comparable to that of the product resulting from the process of Example II. However, no change in its processing characteristics is observed.

Unexpectedly, the product resulting from the process of Example VIII, in which two polymerization temperatures, i.e. a low followed by a high, are used, is characterized by a lower melt viscosity, as expressed in terms of its equilibrium torque value, for its observed relative viscosity. In addition, the finished products prepared from this PVC resin do not contain any unfused resin particles or fish eyes. Substantial enhancement of this effect is obtained when a chain transfer agent is added just prior to the initiation of the temperature increase as is seen in the respective products resulting from the processes of Example V through VII. These enhanced processing characteristics are achieved without any increase in either the reaction pressure during the course of the polymerization or in the heat history of the product as would have been the case if higher reaction temperatures were employed throughout the course of the polymerization in order to achieve a similar effect.

Variations may be made in proportions, procedures and materials without departing from the scope of this invention as defined in the following claims.

What is claimed is:

1. A method for preparing polyvinyl chloride exhibiting improved processing characteristics, said method comprising the steps of:
   1. initiating the free radical suspension polymerization of vinyl chloride monomer in an aqueous medium containing an effective concentration of a suspending agent and in the presence of an effective concentration of a hot free radical initiating catalyst having a 10 hour half-life at a temperature of below about 55° C., said polymerization reaction being conducted at an initial temperature level until a degree of conversion of from about 10 to about 60% is attained; and thereupon
   2. raising the temperature of the system to an increased level with respect to the initial temperature of the system during step (1) and introducing into the system at the initiation of step (2) an effective concentration of a conventional catalyst, said temperature being maintained at this increased level until the completion of the polymerization reaction, thereby yielding a vinyl chloride homopolymer displaying improved processing characteristics.

2. The method of claim 1, wherein the initial temperature level of the system during step (1) is in the range of from about 35° to 55° C. and wherein the increased temperature level in the system during step (2) is within the range of from about 60° to 80° C.

3. The method of claim 2, wherein said initial temperature level is in the range of from about 43° to 48° C. and wherein said increased temperature level is in the range of from about 63° to 68° C.

4. The method of claim 1, wherein the temperature increase of step (2) is affected continuously.

5. The method of claim 1, wherein the temperature increase of step (2) is affected incrementally.

6. The polyvinyl chloride resulting from the process of claim 1.

7. The method of claim 1, wherein step (1) is conducted at said initial temperature level until a degree of conversion of from about 22–32% is attained.

8. A method for preparing polyvinyl chloride exhibiting improved processing characteristics said method comprising the steps of:
1. initiating the free radical, suspension polymerization of vinyl chloride monomer in an aqueous medium containing an effective concentration of a suspending agent and in the presence of an effective concentration of a free radical initiating catalyst, said polymerization reaction being conducted at an initial temperature level until a degree of conversion of from about 10 to 60% is attained and thereupon
2. raising the temperature of the system to an increased level with respect to the initial temperature of the system during step (1) and maintaining the temperature at this increased level until the completion of the polymerization reaction; and,
3. introducing an effective concentration of a chain transfer agent into the system essentially simultaneous with the raising of the polymerization temperature in step (2) so as to have said chain transfer agent present in the system throughout the time said polymerization reaction is being run to completion at said increased temperataure level; thereby yielding a vinyl chloride homopolymer displaying improved processing characteristics.

9. The method of claim 8, wherein said free radical initiating catalyst is selected from the group consisting of hot catalysts.

10. The method of claim 8, wherein a combination of two free radical initiating catalysts is utilized; an effective concentration of a hot catalyst being present in the system during step (1) and an effective concentration of a conventional catalyst being introduced into the system at the initiation of step (2).

11. The method of claim 8, wherein said chain transfer agent is a halogenated, aliphatic hydrocarbon.

12. The method of claim 11, wherein said chain transfer agent is trichloroethylene.

13. The method of claim 8, wherein the initial temperature level of the system during step (1) is in the range of from about 35° to 55° C. and wherein the increased temperature level in the system during step (2) is within the range of from about 60° to 80° C.

14. The method of claim 8, wherein said initial temperature level is in the range of from about 43° to 48° C. and wherein said increased temperature level is in the range of from about 63° to 68° C.

15. The method of claim 8, wherein the temperature increase of step (2) is affected continuously.

16. The method of claim 8, wherein the temperature increase of step (2) is affected incrementally.

17. The polyvinyl chloride resulting from the process of claim 8.

18. The method of claim 8, wherein step (1) is conducted at said initial temperature level until a degree of conversion of from about 22–32% is attained.

* * * * *